UNITED STATES PATENT OFFICE.

JACK CHURCHWARD, OF NEW YORK, N. Y., ASSIGNOR TO WILSON WELDER & METALS COMPANY, INC., A CORPORATION OF NEW YORK.

METALLIC-ARC WELDING.

1,337,543.  Specification of Letters Patent.  Patented Apr. 20, 1920.

No Drawing.  Application filed January 14, 1920. Serial No. 351,357.

*To all whom it may concern:*

Be it known that I, JACK CHURCHWARD, a citizen of the United States, and a resident of the city, county, and State of New York, have invented certain new and useful Improvements in Metallic-Arc Welding, of which the following is a specification.

My invention relates to electric arc welding and particularly to that system known as "metallic-arc" welding wherein the metal to be deposited upon the work is transferred across an arc from a metallic electrode.

One object of my invention is to produce a successful method of electrically welding austenitic steel. This type of steel is frequently used for railroad frogs, switches, rock crushers, and in various other places where a metal is subjected to unusually heavy wear. Austenitic steel is especially well adapted for such purposes on account of its extreme toughness. By austenitic steel I means a steel containing "austenite." The term austenite has been variously employed in the past, but its use is generally confined to the solid solution formed in the solidification of iron-carbon alloys. It, therefore, appears to consist essentially of a solid solution of iron carbid in gamma-iron. It is not apparently possible to prepare pure austenite by quenching a pure iron carbon alloy, since a certain amount of transformation takes place while passing through the critical range however rapidly the quenching is carried out. The stability of austenite is, however, greatly increased by the presence of other constituents such as manganese or nickel. Hitherto, so far as I am aware, all attempts to electrically weld this type of metal have been entirely unsuccessful.

I will now describe one example of the many ways in which my invention may be practised: A round electrode having a diameter of .148 inch was manufactured from manganese austenitic steel containing about 13% manganese, 1% carbon and 86% iron. This electrode was then coacted with a layer of calcium hydroxid $\frac{1}{32}$ to $\frac{1}{16}$ of an inch in thickness to enable the metal to fuse uniformly, without spitting, to prevent oxidation, and to produce a more ductile weld. The coating was applied by immersing the electrode in an aqueous bath of milk of lime after which it was dried in the air. The prepared electrode was then employed for welding a railroad frog of manganese austenitic steel having approximately the same composition as the electrode. The welding was performed with a welding outfit manufactured by the Wilson Welder & Metals Company, Inc., of New York city, operating with a short arc, with a current of about 160 amperes and an I. R. drop across the arc of from 13 to 22 volts. An apparatus of this general type is described in the United States Patent to D. H. Wilson, No. 1,187,408, granted June 13, 1916.

Although I have illustrated my invention by an example of welding with manganese austenitic steel, it is obvious that it is also applicable to welding with other types of austenitic steel such, for example, as nickel austenitic steel which is an alloy of iron containing about 25% nickel. Further illustrations could be given, but they are thought to be unnecessary, as the constituents of austenitic steel may vary considerably without losing the properties peculiar to that alloy. Alloy steels in which austenite is but one of the ingredients may also be welded successfully by my improved method.

It is also obvious that my invention is not restricted to the use of calcium hydroxid as a "weld-regulating" coating for the electrode, as any other alkaline material having similar protective characteristics may be substituted therefor by persons skilled in the art without invention. The use of the "weld-regulating" coating upon the electrode increases the efficiency of the method somewhat, but a coating is not absolutely essential to successful operation, and the invention may be practised with good efficiency without any coating whatever. I desire it to be understood that my invention is not to be limited to the specific example herein disclosed, but that it may be practised in various other ways within the general scope of the following claims.

Having fully described my invention, what I claim as new and desire to secure by Letters Patent is:

1. An electrode for electric arc welding consisting of a homogeneous alloy of iron together with manganese in excess of 12%.

2. An electrode for electric arc welding consisting of an alloy of austenitic steel.

3. An electrode for electric arc welding consisting of a homogeneous alloy of iron containing about 13% of manganese and about 1% of carbon.

4. An alloy for electric arc welding electrodes consisting of a homogeneous alloy of iron containing from 9 to 13% manganese and from 1 to 1¼% carbon.

5. An electrode for electric arc welding consisting of a homogeneous alloy of iron, about 13% of manganese and 1% of carbon, said electrode having a coating of appreciable thickness of calcium hydroxid.

6. An electrode for electric arc welding containing as one ingredient an alloy of austenitic steel and having a coating of a calcium compound of appreciable thickness.

7. An electrode for electric arc welding consisting essentially of an alloy of austenitic steel and having a coating of a weld-regulating substance of appreciable thickness.

8. The method of electric arc welding which comprises transferring welding metal across an arc from an electrode consisting of an alloy of austenitic steel containing manganese and carbon.

In testimony whereof, I have affixed my signature to this specification.

JACK CHURCHWARD.